United States Patent
Bookbinder et al.

(10) Patent No.: US 10,011,517 B2
(45) Date of Patent: Jul. 3, 2018

(54) OPTICAL PREFORMS AND METHODS FOR FORMING THE SAME

(71) Applicant: CORNING INCORPORATED, Corning, NY (US)

(72) Inventors: Dana Craig Bookbinder, Corning, NY (US); Steven Bruce Dawes, Corning, NY (US); Richard Michael Fiacco, Corning, NY (US); Andrey V Filippov, Houston, TX (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 742 days.

(21) Appl. No.: 14/294,389

(22) Filed: Jun. 3, 2014

(65) Prior Publication Data

US 2014/0363670 A1   Dec. 11, 2014

Related U.S. Application Data

(60) Provisional application No. 61/831,820, filed on Jun. 6, 2013.

(51) Int. Cl.
   *C03B 19/09*   (2006.01)
   *C03B 37/012*  (2006.01)

(52) U.S. Cl.
   CPC ........ *C03B 37/01282* (2013.01); *C03B 19/09* (2013.01); *Y02P 40/57* (2015.11); *Y10T 428/2927* (2015.01)

(58) Field of Classification Search
   CPC ......... H01L 21/31695; H01L 21/02203; H01L 21/02337; C03C 3/06; C03C 2201/23;
   (Continued)

(56) References Cited

U.S. PATENT DOCUMENTS 5,185,020 A * 2/1993 Satoh ................ C03B 37/01282
                                                    264/86
5,244,485 A * 9/1993 Hihara .............. C03B 37/01282
                                                    65/17.3

(Continued)

OTHER PUBLICATIONS

Mesarovic et al; "Adhesive Contact of Elastic-Plastic Spheres"; Journal of the Mechanics and Physics of Solids, 48 (2000) 2009-2033.

(Continued)

*Primary Examiner* — Jodi C Franklin
(74) *Attorney, Agent, or Firm* — Robert L. Carlson

(57) ABSTRACT

Optical preforms and methods for forming optical preforms are disclosed. According to one embodiment, a method for producing an optical preform includes compressing silica-based glass soot to form a porous optical preform comprising a soot compact. The porous optical preform is heated to a dwell temperature greater than or equal to 100° C. Thereafter, the porous optical preform is humidified at the dwell temperature in a water-containing atmosphere having a dew point greater than or equal to 30° C. to form a humidified porous optical preform. The soot compact portion of the humidified porous optical preform generally comprises greater than or equal to 0.5 wt. % water.

14 Claims, 13 Drawing Sheets

(58) Field of Classification Search
CPC .............. C03C 2203/54; C03C 13/045; C03C 23/0095; C03C 11/00; C03C 13/04; C03C 2201/02; C03C 25/223; C03C 2218/15; C03C 2218/152; C03B 19/1453; C03B 2201/23; C03B 2201/04; C03B 37/01853; C03B 37/01838; C03B 19/1469; C03B 19/1438; C03B 37/01262
See application file for complete search history.

(56) References Cited

U.S. PATENT DOCUMENTS

| | | | | |
|---|---|---|---|---|
| 2002/0094180 A1* | 7/2002 | Antos | ............... | C03B 37/01446 385/123 |
| 2003/0159468 A1* | 8/2003 | Zeng | ....................... | C03B 5/021 65/86 |
| 2007/0130995 A1* | 6/2007 | Hawtof | ............... | C03B 19/1423 65/377 |
| 2009/0029842 A1* | 1/2009 | Khrapko | ............... | C03B 19/1453 501/53 |
| 2010/0071421 A1* | 3/2010 | Dawes | ............... | C03B 37/01282 65/427 |
| 2010/0107700 A1 | 5/2010 | Dawes et al. | | |
| 2011/0207593 A1* | 8/2011 | Duran | ................. | C03B 19/1407 501/54 |
| 2016/0251252 A1* | 9/2016 | Clinton | ............. | C03B 37/01282 |

OTHER PUBLICATIONS

Israelachvili, J. "Intermolecular and Surface Forces," p. 456-457, Academic Press, NY, 1992.

* cited by examiner

OPTICAL PREFORMS AND METHODS FOR FORMING THE SAME

This application claims the benefit of priority under 35 U.S.C. § 119 of U.S. Provisional Application Ser. No. 61/831,820 filed on Jun. 6, 2013 the content of which is relied upon and incorporated herein by reference in its entirety.

BACKGROUND

Field

The present specification relates generally to methods for forming optical preforms, such as optical fiber preforms and, more particularly, to methods for forming optical preforms by axially pressing silica-based glass soot.

Technical Background

The cladding portion of an optical fiber preform may be formed from an outside vapor deposition (OVD) process in which silica glass is deposited on a glass core cane, for example, through the pyrolysis of octamethyltetrasiloxane. The OVD process is a highly optimized, high yield manufacturing process. However, the formation of the cladding layer is often the rate limiting step in maximizing optical fiber output. Further, it is estimated that as little as 50% of the pyrolysis product of the octamethyltetrasiloxane feedstock is deposited on the glass core canes during deposition of the cladding portion of the optical fiber preform. The remaining pyrolysis product of the octamethyltetrasiloxane feedstock is collected in a baghouse as relatively high purity silica-based glass soot.

In order to further improve optical fiber output and reduce raw material costs, alternative methods of forming the cladding portions of optical preforms are needed.

SUMMARY

According to one embodiment, a method for producing an optical preform includes compressing silica-based glass soot to form a porous optical preform comprising a soot compact. The porous optical preform is heated to a dwell temperature greater than or equal to 100° C. Thereafter, the porous optical preform is humidified at the dwell temperature in a water-containing atmosphere having a dew point greater than or equal to 30° C. to form a humidified porous optical preform. The soot compact portion of the humidified porous optical preform generally comprises greater than or equal to 0.5 wt. % water.

In another embodiment, a method for producing an optical preform includes compressing silica-based glass soot to form a porous optical preform comprising a soot compact portion. The silica-based glass soot may have an average particle size less than or equal to 10 µm and a surface area greater than or equal to about 10 m$^2$/g and less than or equal to about 100 m$^2$/g. The porous optical preform is positioned in a water-containing atmosphere having a dew point greater than or equal to 30° C. and an initial temperature at least 10° C. greater than the dew point. The porous optical preform is heated from the initial temperature to a dwell temperature. The porous optical preform may be held in the water-containing atmosphere for a dwell time sufficient to form a humidified porous optical preform. The soot compact portion of the humidified porous optical preform may have a crush strength which is at least 100% greater than a crush strength of the soot compact portion of the porous optical preform.

In yet another embodiment, a humidified porous optical preform includes a soot compact portion formed from compressed silica-based glass soot having an average particle size greater than or equal to 5 nm and less than or equal to 5 µm. The soot compact portion may include greater than or equal to about 0.5 wt. % water and less than or equal to about 12 wt. % water.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 13:
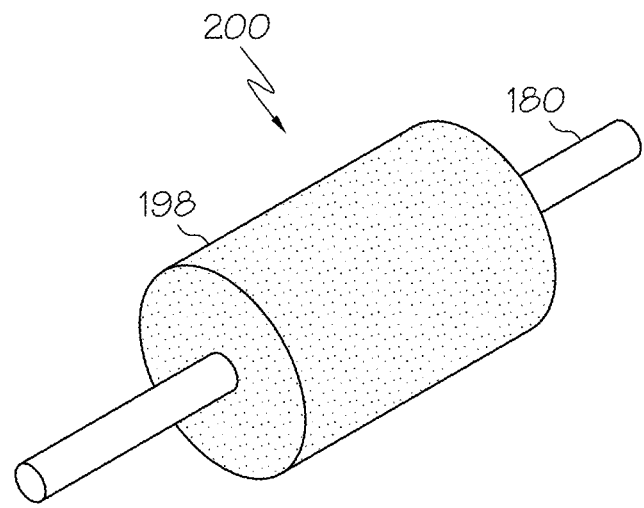
FIG. 13 depicts an porous optical preform comprising a soot compact formed around a glass core cane according to one or more embodiments shown and described herein.

Reference will now be made in detail to the various exemplary embodiment(s), examples of which are illustrated in the accompanying drawings. Whenever possible, the same reference numerals will be used throughout the drawings and description to refer to the same or like parts. One embodiment of a porous optical preform is depicted in FIG. 13. The porous optical preform may be formed by compressing silica-based glass soot to form a porous optical preform comprising a soot compact. The porous optical preform is heated to a processing temperature greater than or equal to 100° C. and humidified at the processing temperature in a water-containing atmosphere having a dew point greater than or equal to 30° C. to form a humidified porous optical preform. The soot compact portion of the humidified porous optical preform comprises greater than or equal to 0.5 wt. % water. Methods of forming porous optical preforms and the optical preforms formed therefrom will be described in more detail herein.

Optical preforms, such as optical fiber preforms, may be formed by compressing silica-based glass soot in a mold to form at least a portion of the optical preform. The silica-based glass soot may, for example, be the waste soot recovered from the formation of an optical preform by the outside vapor deposition process. The re-use of recovered silica-based glass soot may reduce the overall manufacturing costs of the optical preform. The silica-based glass soot is initially compressed to form a porous optical preform which includes, at least in part, a soot compact. Thereafter, the porous optical preform may be sintered and/or consolidated to densify the soot, ultimately creating a consolidated optical preform. The consolidated optical preform may be used, for example, to form optical fiber or other optical components.

While the viability of soot compacts for the formation of optical preforms has been demonstrated, the soot compacts often have low mechanical strength prior to sintering and/or consolidation and may be easily damaged by routine handling during the manufacture of a consolidated optical preform, thereby reducing manufacturing yields and increasing manufacturing costs. Specifically, the soot particles in the soot compact of the porous optical preform are attracted to each other by Van der Waals molecular forces which are the weakest inter-molecular forces. These forces are easily overcome by routine mechanical contact with the soot compact portion of the porous optical preform resulting in damage or even the complete destruction of the preform. Damage or even destruction of the soot compact portion may also result from residual or springback stresses which develop in the soot compact portion during formation and exceed the inherent strength of the compact. The low mechanical strength of the soot compact portion may be further exacerbated when the porous optical preform includes one or more solid glass core portions around which the soot compact portion is formed. The embodiments disclosed herein relate to methods for improving the mechanical properties of porous optical preforms and porous optical preforms formed therefrom.

Various techniques for strengthening the soot compact portion of the porous optical fiber preform have been identified. These mechanisms may be used individually or in combination to enhance the strength of the resultant porous optical fiber preform. The first mechanism involves the introduction of moisture into the soot compact portion of the preform. The moisture forms a meniscus between particles. The surface tension of the water provides a cohesive force that bonds adjacent soot particles together. Silica-based glass soot, as-produced, has a low amount of water (typically between 0.2 and 0.4 wt %). It has been found that silica-based glass soot that is humidified either before or after compaction demonstrates an increase in strength. Specifically, it has been found that increasing the moisture content of the soot compact portion prevents weakening of the soot compact portion as the porous optical preform is heated.

The second mechanism involves exposing the soot compact portion of the porous optical preform to elevated temperatures. It has been found that exposing the soot compact portion of the porous optical preform forms inorganic "necks" between particles. It has been determined experimentally that this necking behavior occurs at temperatures as low as 150° C. and results in an improvement in the strength of the soot compact portion. It has also been determined that this improvement in strength increases with increased thermal exposure time.

Figure 1:
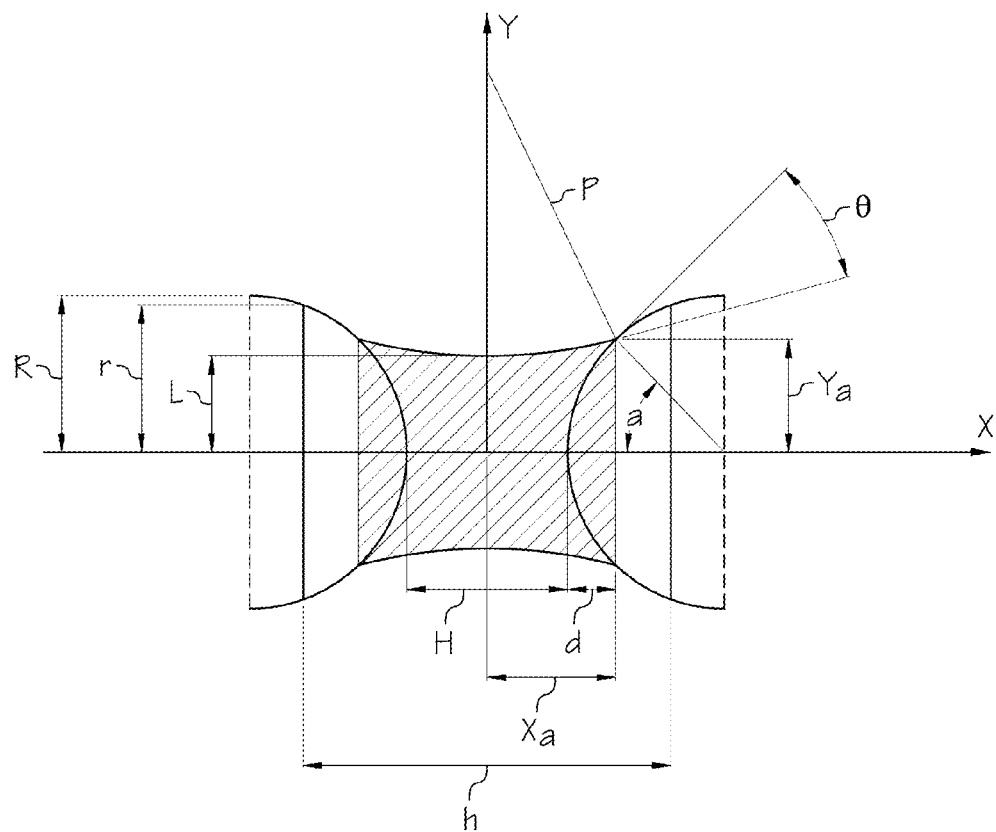
FIG. 1 schematically depicts the geometry of a water bridge between two adjacent particles in a soot compact, according to one or more embodiments shown and described herein.

Regarding the humidification of the soot compact portion, it has been determined that increasing the moisture content of the silica-based glass soot of the soot compact portion of the porous optical preform generally improves the mechanical integrity of the preform prior to consolidation. The improvement in the mechanical properties of soot compact portion of the porous optical preform is related to the dynamic interaction of soot particles having a certain volume of water between them, referred to herein as a "liquid bridge." The existence of a liquid bridge between two particles creates an attractive capillary force which can be evaluated based on the interfacial surface tension σ and geometrical parameters, as depicted in FIG. 1. In atmospheric conditions, the liquid bridge between two contacting particles can originate from capillary condensation. The meniscus radius of curvature of the liquid bridge is then determined by the Kelvin equation:

$$R_k = \frac{-\sigma V_{ML}}{R_u T \ln\left(\frac{p}{p_s}\right)} \tag{1}$$

where $V_{ML}$ is the molar volume of liquid, $R_u$ is the universal gas constant, T is the absolute temperature, and the ratio of water vapor pressure p and the saturated pressure $p_s$ is the air humidity.

Figure 2:
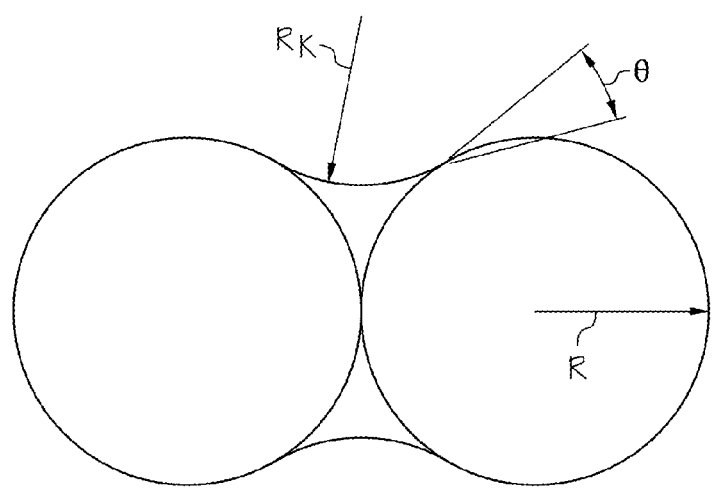
FIG. 2 schematically depicts geometrical factors related to the amount of water absorbed between two adjacent particles in forming a water bridge.
Figure 3:
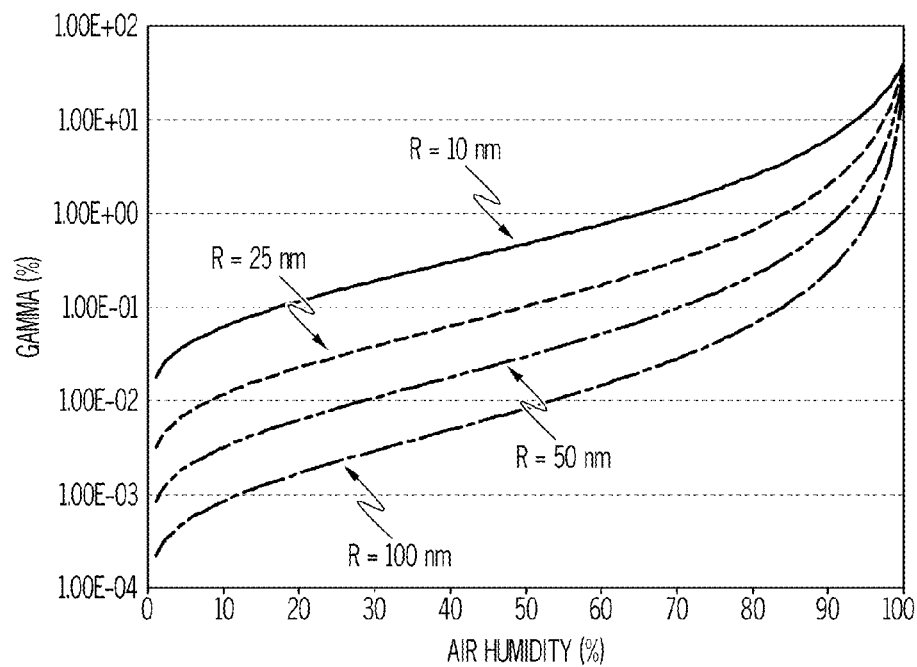
FIG. 3 graphically depicts the fraction of water absorbed in a soot compact as a function of air humidity for different particle sizes.

The amount of water absorbed by the contacting spheres can be determined based on the particle radius R and the Kelvin radius $R_K$ utilizing the geometrical relations shown in FIG. 2. Similar calculations can be carried out for particles in a soot compact, where the average number of particle-particle contacts is about 6. As a result, the relationship between the air humidity and the equilibrium water volume fraction in the soot compact can be determined for different particle sizes, as graphically depicted in FIG. 3. As shown in FIG. 3, for the same air humidity, soot compacts with a primary particle diameter of 20 nm can absorb about 100 times more water than soot compacts with a primary particle diameter of 200 nm, although in both cases the volume fraction of soot in the soot compact remains the same.

Reaching the equilibrium water content in the soot compact requires time, and is mainly controlled by the water vapor diffusivity in the soot compact. The water vapor diffusivity can be calculated knowing the mass of the water molecule $m_1$, the diffusivity of water vapor in the air $D_{12}$, the pore size $d_p$, the pore volume fraction $\epsilon_p$ and the pore tortuosity $\tau$, as shown in equations 2 and 3:

$$D_{1p} = \frac{\epsilon_p}{\tau}\left(\frac{1}{D_{12}} + \frac{1}{D_K}\right)^{-1} \quad (2)$$

$$D_K = \frac{d_p}{3}\sqrt{\frac{8kT}{\pi m_1}} \quad (3)$$

Figure 4:
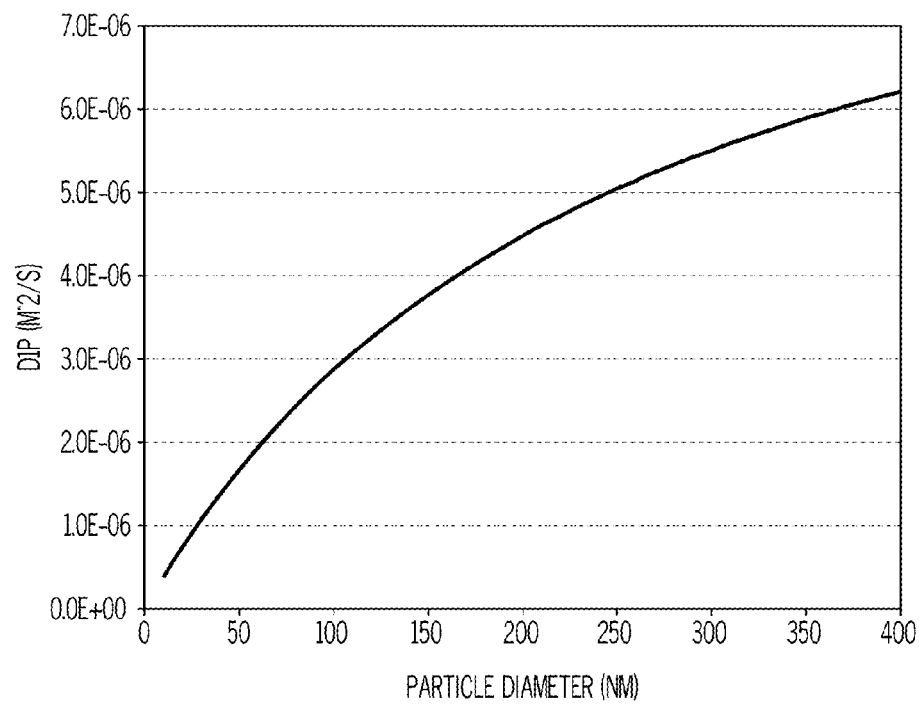
FIG. 4 graphically depicts the calculated water vapor diffusivity in a soot compact as a function of the primary particle size of the soot compact.

FIG. 4 graphically depicts the dependence of the water vapor diffusion coefficient in the soot compact as function of the primary particle size and indicates that the diffusion of water is a much more rapid process for soot with larger primary particles. The characteristic time $t_{ch}$ required for reaching the equilibrium depends on the characteristic length of the pressed soot layer L (eq. 4):

$$t_{ch} = \frac{L^2}{D_{1p}} \quad (4)$$

Figure 5:
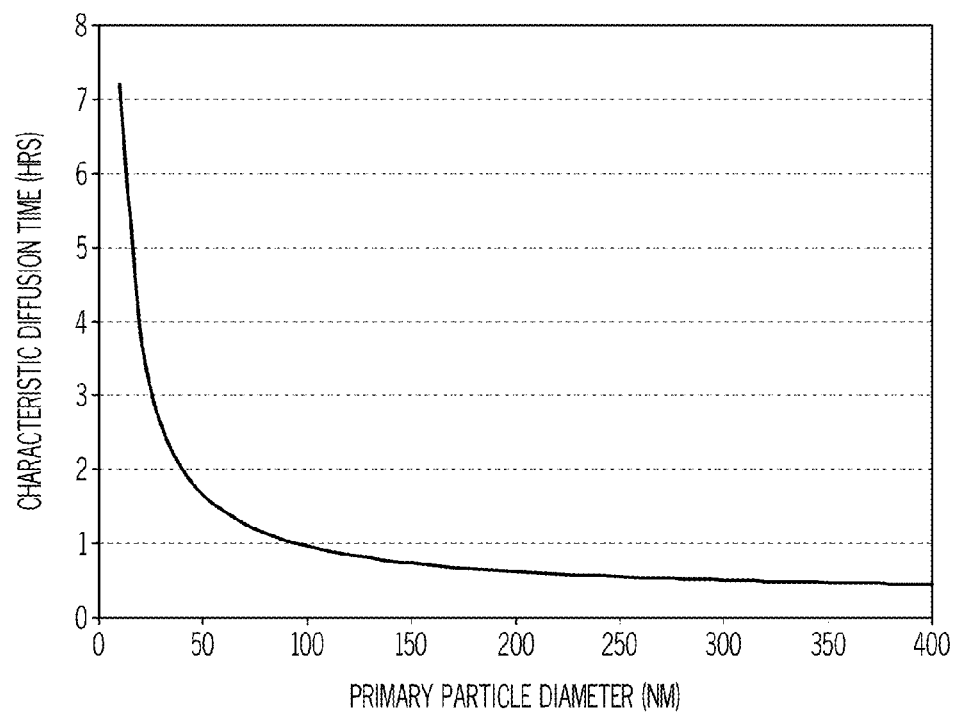
FIG. 5 graphically depicts the characteristic time of vapor diffusion in a soot compact as a function of the primary particle size of the soot compact.

FIG. 5 graphically depicts the dependence of the characteristic water vapor diffusion time in the soot compact on the primary particle size of the soot. It is assumed that the soot compact layer has a thickness of 0.1 m and the vapor diffusivity is calculated using the equation (2). For particle diameters of interest (i.e., 100 nm to 200 nm) the equilibrium water content can be reached within a couple of hours.

Figure 6:
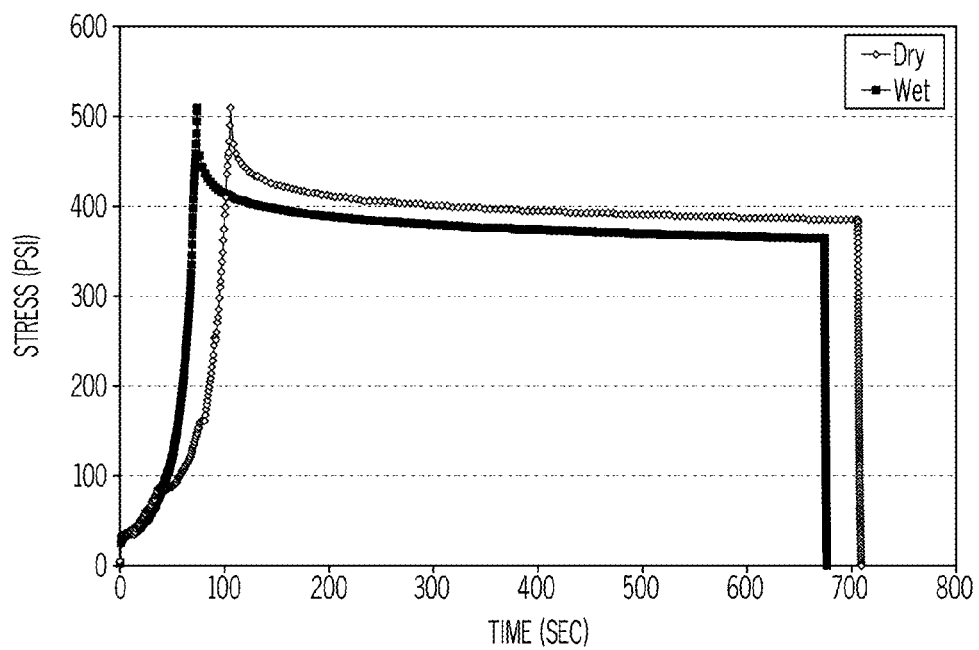
FIG. 6 graphically depicts the compaction stress, peak stress, and stress relaxation for wet and dry soot pellets.
Figure 7:
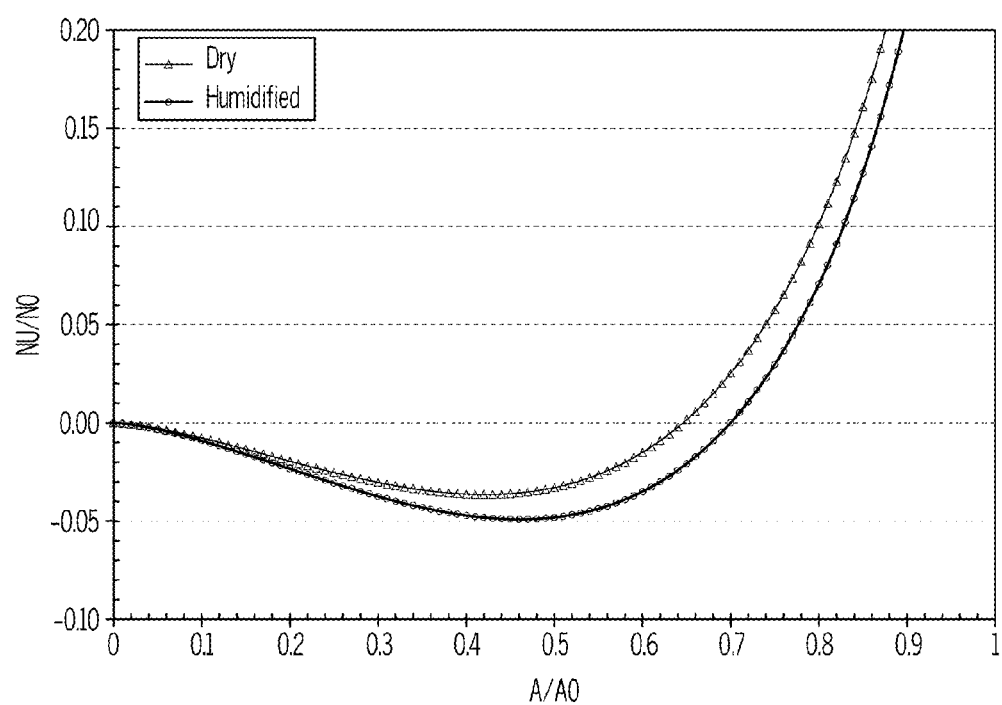
FIG. 7 graphically depicts the modeled tensile stress required to fail wet and dry soot pellets compressed under the same conditions.
Figure 8:
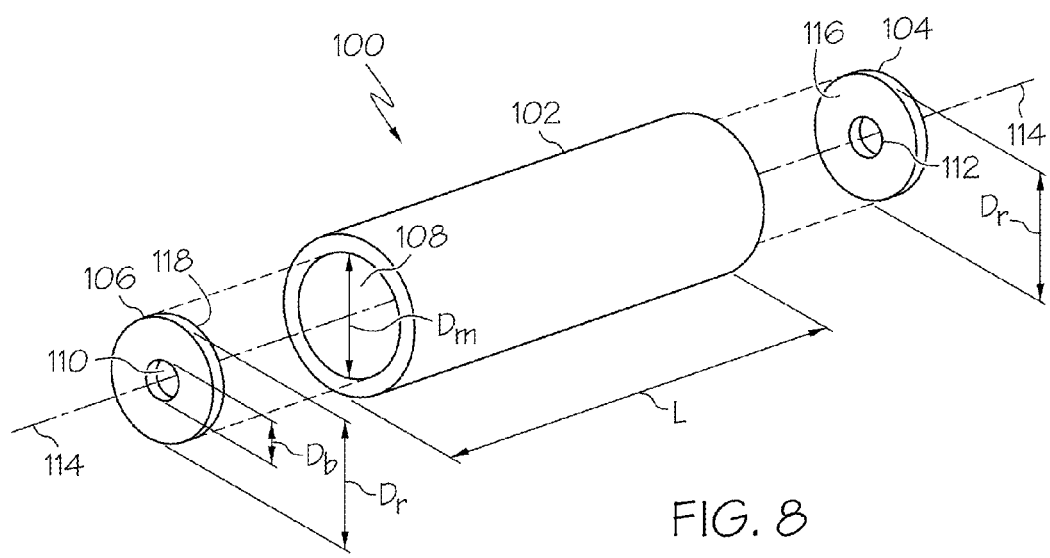
FIG. 8 depicts a mold assembly for forming optical preforms according to one or more embodiments shown and described herein.

Moreover, it has been determined that the mechanical properties of the soot compact, such as the crush strength and compression modulus, generally increase as the moisture content of the soot compact increases. For Example, FIG. 6 graphically depicts the load vs. time curve during compaction of dry silica-based glass soot and silica-based glass soot having a moisture content of 2 wt. % during loading to a peak stress of 509 psi. Based on the stress relaxation observed at the peak loading, the mechanical behavior of the silica-based glass soot can be modeled as a case of elastic-plastic loading and elastic loading using the model of Mesavoric and Johnson (*J. Mechanics and Physics of Solids*, 48, 2009-2033 (2000)). Based on this modeling, it is hypothesized that the tensile stress needed to cause failure for the silica-based glass soot sample with a moisture content of 2 wt. % is approximately 66% greater than the sample formed from dry silica-based glass soot. The results of this modeling are schematically depicted in FIG. 8. For example, a dry silica-based glass soot pellet compacted with a pressure of 509 psi is estimated to fail under a load of approximately 15 psi. In contrast, it is estimated that a silica-based glass soot pellet having a moisture content of 2 wt. % compacted under the same conditions has a failure load of approximately 25 psi.

Utilizing these results, an alternative method for forming suit compacts with improved mechanical properties has been developed.

In the embodiments described herein, a porous optical preform comprising a soot compact is initially created by compressing silica-based glass soot. Thereafter, the soot compact portion of the porous optical preform is humidified by exposing the porous optical preform to a water-containing atmosphere for a predetermined time thereby increasing the moisture content of the soot compact and improving the mechanical properties of the porous optical preform.

In the embodiments described herein, the silica-based glass soot used to form the porous optical preform may comprise commercially available silica-based glass soot or silica glass particles. Alternatively, the silica-based glass soot may be soot recovered from pyrolysis of a chemical vapor deposition operation, e.g., from the deposition of octamethyltetrasiloxane during outside vapor deposition (OVD) of an overclad portion of an optical preform (e.g., silica-based glass soot recycled from an optical fiber preform manufacturing operation). The soot may comprise dopants, such as dopants which increase or decrease the index of refraction of silica glass, or the soot may be substantially pure silica-based glass soot. For example, in some embodiments, the soot may comprise titania ($TiO_2$) which generally increases the index of refraction of silica. In one embodiment, the silica-based glass soot does not contain any binders.

In the embodiments described herein, the silica-based glass soot may have an average particle size of less than about 10 µm or even less than about 5 µm. In some embodiments the average particle size may be less than or equal to 0.5 µm or even less than or equal to 0.3 µm. For example, the silica-based glass soot may have an average particle size from greater than or equal to about 5 nm to less than or equal to about 5 µm, more preferably greater than or equal to about 10 nm to less than or equal to about 500 nm, more preferably from greater than or equal to about 50 nm to less than or equal to about 300 nm, and, most preferably, greater than or equal to about 60 nm to less than or equal to about 250 nm. These ranges generally correspond to silica-based glass soot which has a surface area between about 250 $m^2/g$ to about 5 $m^2/g$, more preferably from about 100 $m^2/g$ to about 10 $m^2/g$ and, most preferably, 50 $m^2/g$ to 10 $m^2/g$. However, it should be understood that the soot pressing methods described herein may be used to compress silica-based glass soot having other particle sizes.

Various methods for compressing the silica-based glass soot into a porous optical preform can be used. For example, in one embodiment, the silica-based glass soot may be axially compressed, as described in U.S. Pat. Pub. No. 2010/0107700 entitled "Methods For Forming Cladding Portions Of Optical Fiber Preform Assemblies" and assigned to Corning Incorporated, the entirety of which is incorporated herein by reference. Alternatively, the silica-based glass soot into a porous optical preform can be used. For example, in one embodiment, the silica-based glass soot may be axially compressed, as described in U.S. Pat. Pub. No. 2010/0071421 entitled "Soot Radial Pressing For Optical Fiber Overcladding" and assigned to Corning Incorporated, the entirety of which is incorporated herein by reference.

Referring to FIG. 8, one embodiment of a mold assembly 100 for forming a porous optical preform by axially compressing silica-based glass soot into an optical preform is schematically depicted. The mold assembly generally comprises a mold body 102, a lower ram 104 and an upper ram 106. The mold body 102 defines a mold cavity 108 centered on and extending along the long axis 114 of the mold body 102. The mold cavity 108 may be cylindrical with a diameter $D_m$ and a length L. The mold body 102 may comprise a rigid, inelastic material such as carbon, aluminum, steel, silicon aluminum oxynitride, silicon carbide or other, similar mechanically durable materials. In one embodiment, the mold body 102 may be formed as a single piece, as shown in FIG. 8.

Figure 9:
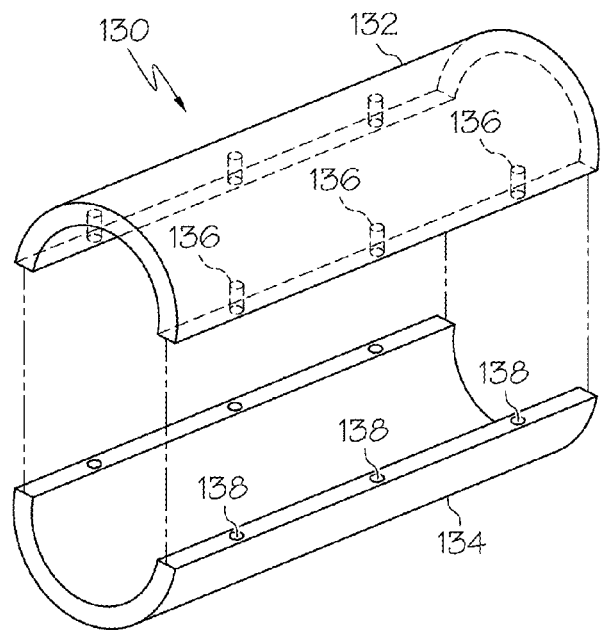
FIG. 9 depicts a segmented mold body for forming optical preforms according to one or more embodiments shown and described herein.

Referring now to FIG. 9, another embodiment of a mold body is shown. In this embodiment, the mold body is a segmented mold body 130 formed from a plurality of mold segments 132, 134 extending along an axial direction. In the embodiment shown, the mold segments 132, 134 may be fastened together by inserting fasteners through fastener holes 136 positioned along the edge of the mold segment 132 and into corresponding threaded holes 138 positioned along the edge of mold segment 134. However, it should be understood that the mold segments may be joined together using a variety of other fasteners and/or fastening techniques. For example, mold segment 132 may be coupled to mold segment 134 using one or more bands (not shown) which extend around the circumference of the assembled segments thereby securing mold segment 132 to mold segment 134.

Still referring to FIG. 9, the segmented mold body 130 may be lined with a material (not shown) such that the interior surface of the segmented mold body 130 is substantially continuous. In one embodiment, the lining material may comprise a low-friction polymeric material such as polytetrafluoroethylene (PTFE) or a similar material. In another embodiment, the lining material may comprise non-polymeric low friction materials such as carbon sheet or similar materials. The lining material may comprise a sheet of lining material positioned against the wall of the mold cavity 108 or a coating applied to the mold cavity 108.

It should be understood that, while FIG. 9 depicts the segmented mold body 130 as comprising two mold segments 132, 134, the segmented mold body 130 may comprise three or more mold segments which, when joined together, generally define a cylindrical mold cavity.

The diameter $D_m$ of the mold cavity 108 and the length L of the mold cavity 108 are generally selected to arrive at the desired final dimensions of the fully consolidated optical preform made according to the soot pressing method described herein. For example, to produce a production ready optical preform, the diameter of the mold cavity 108 of the mold body 102 may be on the order of 20 cm which may yield an optical preform having an outer diameter on the order of 15 cm following consolidation. Further, the length of the mold cavity may be on the order of 2 m or greater. Criteria for selecting the diameter of the mold cavity to achieve the desired optical preform dimensions will be discussed further herein.

Referring again to FIG. 8, the lower ram 104 and upper ram 106 are generally disc-shaped and have an outer diameter $D_r$. The outer diameter $D_r$ of the rams 104, 106 may be slightly smaller than the diameter $D_m$ of the mold cavity 108 such that the rams 104, 106 may be positioned in the mold cavity 108 and slidably positioned relative to one another along the long axis 114 of the mold body 102. The rams 104, 106 may be made of metal, such as aluminum or steel, plastic or any other material having suitable durability. In embodiments in which the mold assembly 100 is used to form a porous optical preform comprising a central core cane surrounded by a soot compact, each of the lower ram 104 and upper ram 106 may comprise a bore 112, 110, respectively, extending through the center of the ram such that, when the rams 104, 106 are positioned in the mold cavity 108, the bores 112, 110 are centered on the long axis 114 of the mold body 102. Each bore 112, 110 may have a diameter $D_b$ which generally corresponds to the diameter of the glass core cane used for making the optical preform assembly. However, it should be understood that, in alternative embodiments (not shown), the rams 104, 106 may be formed without bores, such as when the resultant porous optical preform comprises a soot compact without a central core cane.

As shown in FIG. 8, the rams 104, 106 each comprise an interior surface 116, 118, respectively. The interior surfaces 116, 118 are opposed to one another when the rams 104, 106 are positioned in the mold cavity 108. In the embodiment shown in FIG. 8, the interior surfaces 116, 118 of the rams 104, 106 are generally planar. However, it should be understood that the interior surfaces 116, 118 of the rams 104, 106 may comprise other surface geometries. For example, the interior surfaces 116, 118 of the rams 104, 106 may be conically tapered or parabolically shaped in order to shape the end portions of the soot compact formed by compressing silica-based glass soot between the rams 104, 106 in the mold cavity 108 to improve the shape retention of the soot compact upon sintering and/or consolidation. Moreover, the interior surfaces 116, 118 of the rams 104, 106 may have a parabolic geometry to optimize reflection and/or dissipation of vibratory energy introduced into the mold cavity 108 through the mold body 102.

Figure 10:
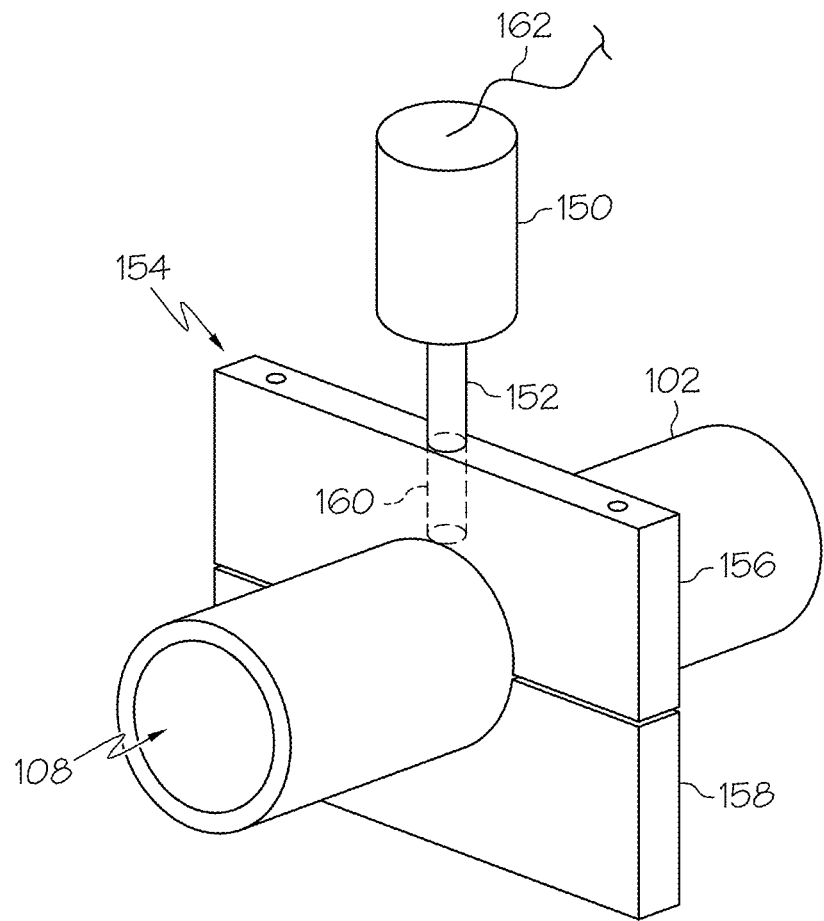
FIG. 10 depicts a mold assembly coupled to an ultrasonic source according to one or more embodiments shown and described herein.

Referring now to FIG. 10, a mold body 102 of the mold assembly 100 is shown coupled to an ultrasonic source 150. The ultrasonic source 150 may be used to apply vibratory energy to the mold body 102 which is, in turn, propagated into the mold cavity 108. The vibratory energy fluidizes the silica-based glass soot loaded in the mold cavity 108 thereby reducing drag or friction between adjacent soot particles and the friction between soot particles and the interior of the mold which, in turn, facilitates compressing silica-based glass soot to a greater and more uniform density along the length L of the mold than without the application of vibratory energy. The greater and more uniform density of soot compacts produced by applying vibratory energy during formation of the soot compact, when consolidated, produces a consolidated optical preform having very little taper from the ends of the preform to the center of the preform (e.g., the density of the glass formed from the soot compact is substantially uniform along the axial length of the porous optical preform).

The ultrasonic source 150 is coupled to the mold body 102 with a waveguide 152 and mounting collar 154. In the embodiment shown, the mounting collar 154 comprises a first collar portion 156 and a corresponding second collar portion 158. The first collar portion 156 and the second collar portion 158 may be positioned around the mold body 102 and fastened together such that the mounting collar 154 is securely attached to the mold body 102. The first collar portion 156 may comprise a channel 160 extending through the first collar portion 156. The waveguide 152 may be positioned in the channel 160 such that the waveguide 152 is positioned proximate the mold body 102 but not in direct contact with the mold body 102. The ultrasonic source 150 is coupled to an end of the waveguide 152 opposite the mold body 102 such that vibratory energy generated by the ultrasonic source 150 may be propagated along the waveguide 152, into the mounting collar 154 and, thereafter, to the mold body 102.

The ultrasonic source 150 may be coupled to a control unit (not shown) via electrical cable 162. The control unit may comprise a signal generator and a 5 kW power amplifier. The signal generator may be operable to produce various low voltage (e.g., 5-10 volts) electronic waveforms which are amplified by the power amplifier before the control unit passes the electronic waveforms to the ultrasonic source 150 via the electrical cable 162. A transducer in the ultrasonic source 150 converts the electronic waveforms to vibratory energy which is propagated along the waveguide 152 to the mold body 102 thereby mechanically vibrating the mold body 102 and the contents of the mold cavity 108. The electronic waveforms generated by the signal generator and passed to the ultrasonic source 150 may take on a variety of forms including, without limitation, sinusoidal waveforms, square wave waveforms, sawtooth waveforms, triangular waveforms and the like. In one embodiment, the ultrasonic source 150 may receive electronic waveforms from the control unit and, based on the received electronic waveforms, generate high frequency vibrations having a frequency from about 15 kHz to about 50 kHz (e.g., a range of frequencies spanning from acoustic or audible frequencies to ultrasonic frequencies) and, more preferably, from about 17 kHz to about 25 kHz.

Figure 11:
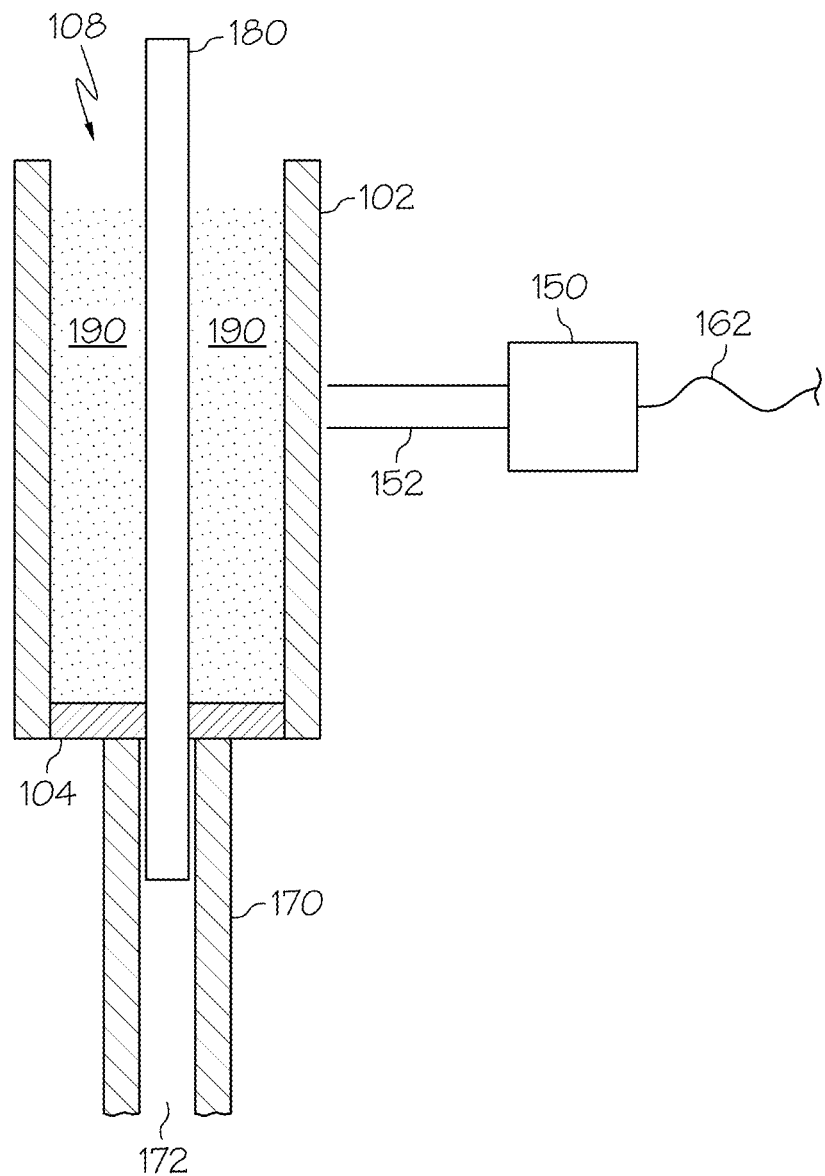
FIG. 11 depicts a cross section of a mold assembly and ultrasonic source loaded with uncompressed silica-based glass soot according to one or more embodiments shown and described herein.

Referring now to FIG. 11, a cross section of a mold body 102 is shown. In general, to form a porous optical preform (e.g., a glass core cane surrounded by a soot compact), a glass core cane 180 is first positioned in the mold cavity 108 and silica-based glass soot 190 is loaded around the rod and compressed to form the soot compact portion of the porous optical fiber preform. The desired dimensions of the fully consolidated optical preform govern the exact dimensions of the mold cavity and the final density of the soot compact created by the pressing operation. For typical laboratory scale consolidated optical preforms, the desired core/clad ratio of the preform was 0.069 meaning that the core portion of the consolidated optical preform is 6.9% of the preform diameter. Thus, starting with a glass core cane having a 19 mm diameter and a core/clad ratio of 0.23 (meaning the core diameter is 23% of the cane diameter or 4.18), the outside diameter of the preform after consolidation should be about 61 mm to achieve the desired core/clad ratio of 0.069. Using the shrinkage rates for a given density of compacted silica-based glass soot, the size of the mold needed to achieve a consolidated optical preform of the desired dimensions may be determined. For example, silica-based glass soot having a density of 0.81 g/cc has an axial shrinkage of 21% and a radial shrinkage of 32% after consolidation to glass. Accordingly, to achieve a consolidated optical preform having an outer diameter of 61 mm, the diameter of the mold must be about 89 mm. Generally, to determine the necessary mold diameter to achieve a desired consolidated optical preform geometry requires the following: the compacted soot density; experimentally derived values for axial and radial shrinkage upon consolidation for a given soot density and the core/clad ratio of the glass core cane.

In order to form a porous optical preform comprising a glass core cane 180 surrounded by and coaxial with a soot compact portion, a glass core cane 180 may be positioned in the mold cavity 108. More specifically, the glass core cane 180 is positioned in the bore of the lower ram 104 such that the glass core cane 180 is substantially centered on the long axis of the mold body 102. The glass core cane 180 may comprise a cylindrical silica glass-based core cane comprising at least a pure silica glass core or doped silica glass core. The glass core cane may also comprise additional glass layers surrounding the core, such as an inner cladding layer or the like, and such additional layers may include dopants such that the glass layers have an index of refraction different than that of the glass core. In some embodiments, the glass core cane 180 may optionally include a porous silica layer deposited on the glass core cane by outside vapor deposition. The porous silica layer acts as an interface between the glass core cane and the soot compact portion formed thereon, improving adhesion of the soot compact portion to the glass core cane.

In embodiments of the porous optical preform which include a glass core cane, residual stresses may develop in the soot compact portion during formation of the soot compact. Without further strengthening according to the mechanisms described herein, these residual stresses diminish the mechanical strength of the soot compact portion of the porous optical preform, increasing the likelihood that the soot compact may be damaged or even destroyed during routine handling.

As shown in FIG. 11, the glass core cane 180 may extend through the lower ram 104 and into a guide channel of lower ram extension 170. The lower ram extension 170 and upper ram extension 174 (shown in FIG. 12 and discussed further herein) transmit pressure from a press arm (not shown) of a press (not shown) to the rams 104, 106 thereby driving the rams 104, 106 towards one another along the axial direction of the mold body 102.

After the glass core cane 180 is positioned in the mold cavity 108, the mold cavity 108 is loaded with silica-based glass soot 190. The amount of silica-based glass soot 190 loaded into the mold cavity 108 is dependent on the diameter of the mold cavity 108, the desired length of the consolidated optical preform, and the desired core/clad ratio for the consolidated optical preform. Based on these considerations, the amount of silica-based glass soot 190 added to the cavity is selected such that the target soot density for a soot compact portion 198 of the porous optical preform is from about 0.5 g/cc to about 1.2 g/cc, more preferably greater than about 0.7 g/cc and less than about 1.1 g/cc, and most preferably greater than about 0.8 g/cc and less than about 1.0 g/cc.

In one embodiment, the silica-based glass soot 190 is loaded into the mold cavity 108 in a single step, as shown in FIG. 11. In this embodiment, as the silica-based glass soot 190 is loaded into the mold cavity 108, the silica-based glass soot may be stirred with slack in the glass core cane 180 to evenly distribute the soot in the mold cavity 108. Additionally or alternatively, the mold body 102 may be tapped and/or vibrated with the ultrasonic source as the silica-based glass soot is loaded into the mold cavity 108 to encourage uniform packing of the silica-based glass soot in the mold cavity 108. For example, vibratory energy may be applied to the mold cavity with the ultrasonic source 150 thereby fluidizing the silica-based glass soot and reducing friction between adjacent silica-based glass soot particles and reducing friction between silica-based glass soot particles and the interior surfaces of the mold cavity. When the silica-based glass soot is fluidized by the application of vibratory energy, the density of the silica-based glass soot loaded in the cavity may be increased without the application of mechanical pressure. Furthermore, the application of vibratory energy promotes uniformity in the density of the silica-based glass soot over the length of the mold body 102. In one embodiment, when vibratory energy is applied to the mold body 102 as the silica-based glass soot is loaded into the mold cavity, the silica-based glass soot may reach a density of at least about 0.35 g/cc and, more preferably, greater than about 0.37 g/cc without mechanically pressing the silica-based glass soot.

In another embodiment, silica-based glass soot may be loaded into the mold cavity 108 as a vacuum is drawn on the mold. For example, in one embodiment, a vacuum system (not shown) may be coupled to the mold cavity 108 proximate the lower ram 104. This may be accomplished by positioning the mold body 102 in a vacuum base (not shown) operatively coupled to a vacuum system such that the mold cavity is fluidly coupled to the vacuum system. As silica-based glass soot is loaded in the mold cavity 108, the vacuum system is used to extract air (including moisture in the air) from the mold cavity 108 and silica-based glass soot which, in turn, increases the density of the silica-based glass soot prior to compaction. In another embodiment, such as when the mold body 102 is constructed of a porous material, a vacuum may be drawn outside the mold body 102 thereby drawing air and/or moisture through the mold body 102 as soot is loaded into the mold cavity 108. Vacuum assisted loading of silica soot may be performed in conjunction with the application of vibratory energy.

Figure 12:
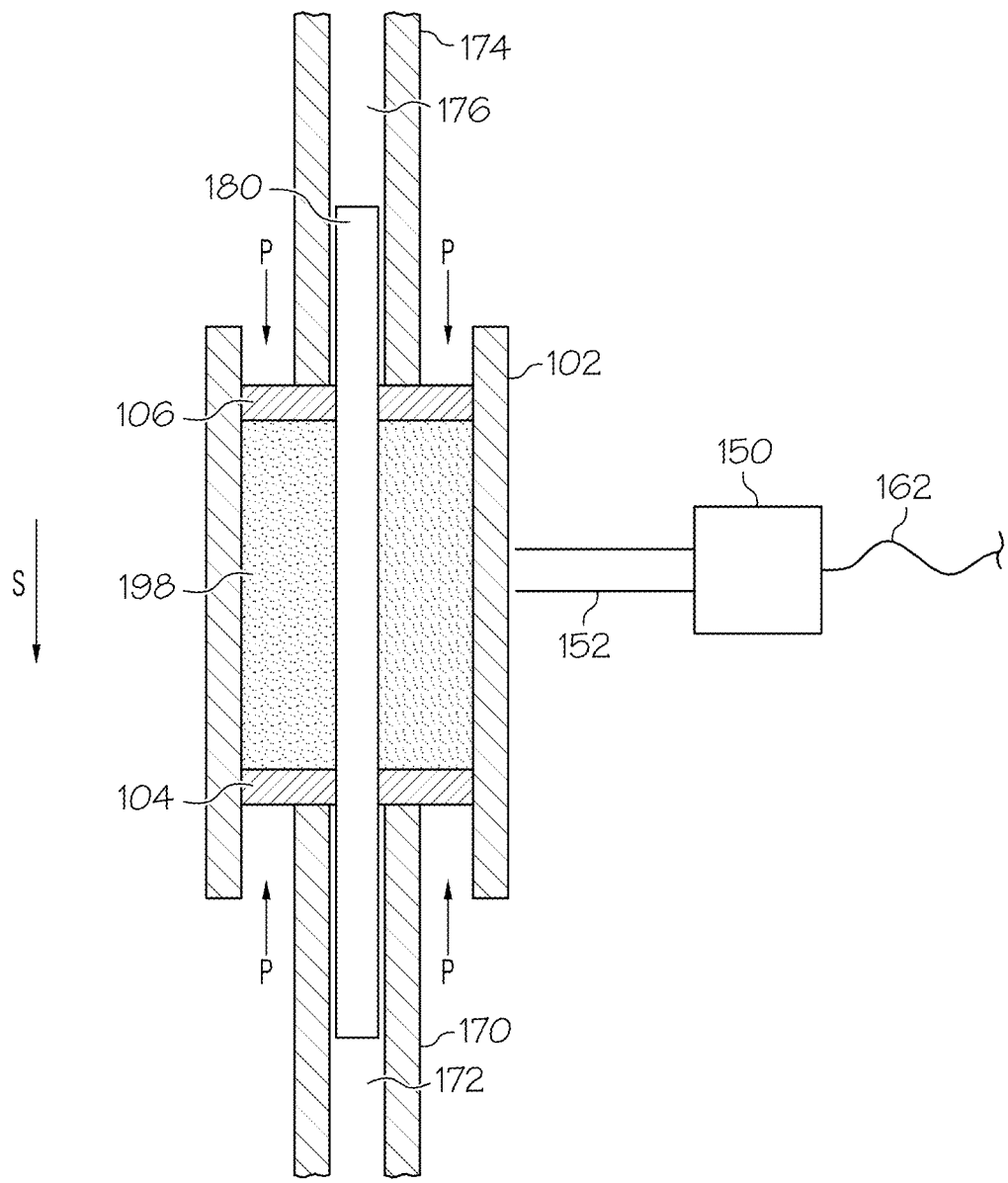
FIG. 12 depicts a cross section of a mold assembly and ultrasonic source being used to form a soot compact around a glass core cane according to one or more embodiments shown and described herein.

Referring now to FIG. 12, after the mold cavity 108 is loaded with the desired amount of silica-based glass soot, the silica-based glass soot may be axially compressed to form a soot compact portion 198 around the glass core cane 180. To axially compress the silica-based glass soot, the upper ram 106 may be positioned in the mold cavity 108 such that the glass core cane 180 is inserted through the bore of the upper ram 106 and the upper ram 106 is in direct contact with the loaded silica-based glass soot. The mold assembly may then be positioned in a press and the upper ram extension 174, which may be coupled to the press arm (not shown) of the press, is positioned against the upper ram 106 such that the glass core cane 180 is disposed in the guide channel 176 of the upper ram extension 174. In one embodiment, the lower ram extension 170 may be positioned on a support plate (not shown) of the press. In another embodiment the lower ram extension may be positioned on a second press arm (not shown).

In one embodiment, after the mold assembly 100 is positioned in the press, the ultrasonic source 150 may be used to apply vibratory energy to the mold body 102 before axial pressure is applied to the rams 104, 106. The vibratory energy may be applied to the mold body throughout the pressing operation in order to increase the density of the compressed silica-based glass soot during the pressing operation and to improve uniformity in the density of the resulting soot compact portion of the porous optical preform. It has been found that, when vibratory energy is applied to the mold body 102 during the soot pressing process, less pressure is needed to achieve the same or greater densities of compacted soot than in soot pressing operations where no vibratory energy is applied to the mold body 102.

In another embodiment, when a segmented mold is used in conjunction with a low friction (relative to silica-based glass soot) lining material, it has been found that no vibratory energy need be applied to the mold body 102 during the soot compaction process to reach the same amount of compaction as achieved with a solid, unlined mold body. This is because the friction between the silica-based glass soot particles and the lining material is sufficiently low that the silica-based glass soot adjacent to the lining material of the mold cavity 108 is easily compressed (e.g., the silica-based glass soot does not drag on the mold wall) thereby reducing or eliminating the need for vibratory energy to cause the fluidization of the silica-based glass soot along the mold wall.

In yet another embodiment, a vacuum system may be used to purge the mold of air during the pressing operation thereby eliminating air in the soot compact and reducing the overall compression time needed to obtain a soot compact of the desired density.

With the mold assembly positioned in the press, pressure P is applied to the upper ram 106 and the lower ram 104 with the press via the ram extensions 170, 174 such that the silica-based glass soot is compressed between the rams 104, 106. In one embodiment, the press is used to apply pressure to the upper ram 106 thereby advancing the upper ram 106 toward the lower ram 104. The upper ram 106 may be advanced at a rate of about 0.1 mm/sec to about 10 mm/sec and, more preferably 0.1 mm/sec to about 2.0 mm/sec. During the pressing operation, the mold body 102 is supported and allowed to slide in the axial direction (indicated by arrow S in FIG. 12) at a rate of about ½ the rate at which the upper ram 106 is advanced so that both the top and the bottom rams move toward the middle of the mold. Allowing the mold body to slide maintains the symmetry of the compaction forces around the center of the soot compact portion 198 and, when vibratory energy is being applied, keeps the ultrasonic source positioned at the center portion of the soot compact portion 198 throughout the pressing operation.

In one embodiment, the axial position of each ram 104, 106 relative to the mold body 102 is monitored as the silica-based glass soot is compressed. Measuring the axial position of each ram 104 may be accomplished by placing a sensor (not shown), such as an ultrasonic sensor, a proximity sensor, an optical sensor, or the like, on a fixed point above and/or below the mold body 102 and using the sensor to measure the distance between the sensor and the ram as the ram is advanced along the axis of the mold body 102. In another embodiment, the axial position of the rams in the mold body 102 may be directly measured such as by Vernier calipers or similar measurement devices (not shown) operatively coupled to the rams and/or mold body 102. The use of sensors or measurement devices to detect the position of the rams in the mold cavity enables a real time calculation of the average density of the pressed silica-based glass soot based on the position of the rams in the mold cavity, the dimensions of the mold cavity, the dimensions of the rams, and the mass of silica-based glass soot placed in the mold cavity 108. The real time measurement of soot density may be used as a process control variable for the soot pressing process. More specifically, when the silica-based glass soot is compressed to a target density, as determined from the real time measurements, no additional mechanical pressure may be applied to the rams 104, 106.

In another embodiment, when the press is a hydraulically actuated press, the hydraulic line pressure of the hydraulic press is monitored and used to control the soot pressing process. The pressure in the hydraulic lines of the press is indicative of the resistance experienced by the hydraulic press arm as the silica-based glass soot is compressed. Accordingly, as the density of the soot increases through compression, the pressure in the hydraulic lines also increases. Thus, for given mold dimensions and mass of silica-based glass soot loaded into the mold cavity 108, the hydraulic line pressure may be indicative of the density of the soot during soot pressing process. Accordingly, the hydraulic line pressure may be used to determine when the compressed soot has reached a target density.

While either the real time measurement of soot density or the hydraulic line pressure may be used as a process control variable for the soot pressing process, it should be understood that both may be used in order to determine the density of the soot during the soot pressing process.

In another embodiment, a load cell may be attached to the lower ram 104 to measure the actual compaction force applied to the silica-based glass soot disposed in the mold cavity. Data derived from the load cell the axial displacement of the rams in the mold cavity, the mass of the suit, and the mold dimensions may be used to assure proper operation of the system and uniformity in the density of the resulting soot compact and, as such, may be used for quality control purposes.

As described hereinabove, the silica-based glass soot is pressed until a target soot density is reached for the resulting soot compact portion 198. The target soot density for a soot compact portion 198 of the porous optical preform may be from about 0.5 g/cc to about 1.2 g/cc, more preferably greater than about 0.7 g/cc and less than about 1.1 g/cc, and most preferably greater than about 0.8 g/cc and less than about 1.0 g/cc. In one embodiment, as the target soot density is approached, the application of vibratory energy is discontinued. For example, the application of vibratory energy may be discontinued when the calculated density of the soot compact is within 0.01 g/cc of the target density. Once the target density is reached, the pressure exerted on the rams at the target density is maintained as a static load for a predetermined relaxation time period to allow the soot compact to relax under the pressure. In one embodiment, the relaxation time period is from about 1 minute to about 10 minutes.

Following the relaxation period, pressure on the soot compact portion 198 is released and the upper ram 106 and the lower ram 104 are removed from the mold cavity 108 leaving the soot compact portion 198 with embedded glass core cane 180 in the mold cavity 108. As shown in FIG. 13, the soot compact portion 198 and embedded glass core cane 180 form a porous optical preform 200 where the soot compact portion 198 forms a cladding portion of the porous optical preform 200 and the glass core cane 180 forms a core portion of the porous optical preform 200.

While specific reference has been made herein to embodiments of a porous optical preform comprising a soot compact portion 198 with an embedded glass core cane 180, it should be understood that other embodiments are possible and contemplated. For example, in some embodiments, the porous optical preform may consist only of the soot compact without an embedded glass core cane. Further, while specific reference has been made herein to embodiments where silica-based glass soot is axially compressed to form a porous optical preform, it should be understood that other methods of forming the porous optical preform are contemplated, including, without limitation, radially compressing silica-based glass soot.

After the porous optical preform is removed from the mold assembly 100, the preform is positioned in a humidifying chamber to increase the moisture content of the soot compact portion of the porous optical preform. In the embodiments described herein, the humidifying chamber may be heated, such as when the humidifying chamber is a consolidation furnace or holding oven commonly used in the manufacture of optical preforms. As described hereinabove, increasing the moisture content of the soot compact portion of the porous optical preform improves the mechanical integrity of the soot compact, making the soot compact less susceptible to damage from mechanical contact. In the embodiments described herein, a humidified gaseous carrier, such as air, steam or another suitable carrier gas or mixture of carrier gases, is passed through the humidifying chamber to increase the moisture content of the soot compact portion of the porous optical preform. The humidifying chamber may be heated to expedite the humidification of the soot compact. In some embodiments, the humidifying chamber may be heated to a temperature of greater than or equal to about 150° C. in order to induce necking between adjacent soot particles which, in addition to humidification, improves the strength of the soot compact portion. In one exemplary embodiment, the humidifying chamber comprises a consolidation furnace coupled to a steam generator such that the steam generator supplies steam (i.e., a water-containing atmosphere) to the interior volume of the furnace. The steam may be directed into the consolidation furnace by itself or entrained in a carrier gas such as air, nitrogen, or the like. Alternatively, a hot water system may be used to create the water-containing atmosphere in the consolidation furnace. For example, a carrier gas may be bubbled through a heated water bath to humidify the carrier gas which, in turn, is directed into the consolidation furnace.

In the embodiments described herein, the porous optical preform is positioned in the humidifying chamber under conditions sufficient to increase the moisture content of the soot compact from atmospheric concentrations under standard temperature and pressure (i.e., approximately 0.2 wt. % to 0.4 wt. %) to concentrations of up to 12 wt. %. For example, after humidification, the moisture content of the soot compact portion of the optical preform may be greater than or equal to about 0.5 wt. % and less than or equal to 12 wt. % after humidification, preferably greater than or equal to 2 wt. % and less than or equal to 12 wt. %, and more preferably greater than or equal to 2 wt. % and less than or equal to 5 wt. %.

In order to achieve the desired water content, the moisture containing atmosphere inside the humidifying chamber may have a dew point of greater than or equal to about 30° C. In some embodiments, the moisture containing atmosphere inside the humidifying chamber may have a dew point of greater than or equal to about 50° C. or even greater than or equal to 80° C. For example, in some embodiments, the atmosphere within the humidifying chamber may have dew point at one atmosphere of pressure of greater than or equal to about 30° C. and less than or equal to about 100° C. at 1 atmosphere, more preferably greater than or equal to about 50° C. and less than or equal to about 100° C. at 1 atmosphere, even more preferably greater than or equal to about 80° C. or even 95° C. and less than or equal to about 100° C. at 1 atmosphere.

For a given relative humidity of the water-containing atmosphere, heating the humidifying chamber decreases the dwell time of the porous optical preform in the chamber necessary to achieve a desired moisture content. Accordingly, the humidifying chamber may be heated to a dwell temperature greater than or equal to about 100° C. or even at a dwell temperature greater than or equal to about 200° C. In embodiments in which the soot compact portion of the porous optical preform is formed around a solid glass core cane, the core cane can become re-wetted at temperatures above 900° C. which, depending on the desired refractive index profile of the optical preform, may lead to attenuation at 1383 nm. Accordingly, in some embodiments, the humidifying chamber may be heated to a dwell temperature greater than or equal to about 200° C. to less than or equal to about 900° C., preferably greater than or equal to about 400° C. to less than or equal to about 900° C., more preferably, greater than or equal to about 600° C. to less than or equal to about 900° C., and, most preferably, greater than or equal to about 800° C. to less than or equal to about 900° C. In some embodiments, the humidifying chamber is heated to a dwell temperature of at least about 150° C. In these embodiments, the elevated temperature of the humidifying chamber causes inorganic necks to form between the adjacent soot particles, further enhancing the strength of the soot compact portion in addition to humidification.

In embodiments where the dwell temperature of the humidifying chamber is at least 150° C., the presence of moisture in the chamber expedites necking between particles and prevents weakening of the compact. In addition, the higher moisture content of the soot compact portion increases sufficiently increases the strength of the optical fiber preform such that the soot compact portion does not mechanically fail prior to reaching the temperature at which necking occurs. Once the necking temperature is reached and surpassed, the combination of the higher moisture content and the necks formed between adjacent soot particles act in conjunction with one another to improve the mechanical strength of the soot compact portion, thereby enabling further processing of the porous optical preform, such as consolidation, with reduced risk of damaging the porous optical preform.

In the embodiments described herein, the humidifying chamber is maintained at 1 atmosphere of pressure. However, it should be understood that the humidifying chamber may be pressurized to pressures greater than 1 atmosphere to decrease the dwell time of the porous optical preform in the chamber necessary to achieve a desired moisture content.

Further, in some embodiments described herein, the humidifying chamber is initially heated to an initial temperature which is at least 10° C. greater than the dew point of the water-containing atmosphere of the humidity chamber prior to inserting the porous optical preform in to the humidifying chamber. Preheating the humidifying chamber to an initial temperature prevents the condensation of moisture on to the porous optical preform as it is inserted into the humidifying chamber. In some embodiments, the initial temperature of the humidifying chamber is at least 20° C. greater than the dew point of the water-containing atmosphere of the humidity chamber prior to inserting the porous optical preform in to the humidifying chamber. In some other embodiments, the initial temperature of the humidifying chamber is greater than or equal to 10° C. and less than or equal to 30° C. greater than the dew point of the water-containing atmosphere of the humidity chamber prior to inserting the porous optical preform in to the humidifying chamber. After the porous optical preform is inserted in to the humidifying chamber, the initial temperature of the heating chamber is ramped to the dwell temperature.

In the embodiments described herein, the porous optical preform is maintained in the humidifying chamber for a dwell time sufficient to achieve the desired moisture content in the soot compact portion. For example, the dwell time may be from greater than or equal to about 0.25 hour or even 0.5 hour to less than or equal to about 48 hours. Preferably, the dwell time may be from greater than or equal to about 0.25 hour or even 0.5 hour and less than or equal to about 24 hours, more preferably greater than or equal to about 0.25 hour or even 0.5 hour and less than or equal to about 10 hours. In some embodiments, the dwell time may be as low as 2 hours, for example, from about 0.25 hours to less than or equal to 2 hours. However, it should be understood that shorter or longer dwell times may be utilized depending on the size of the soot compact portion of the porous optical preform, the relative humidity of the water-containing atmosphere, the temperature of the humidifying chamber and the like. As noted hereinabove, the dwell time may be reduced for a particular relative humidity level by increasing the temperature of the humidifying chamber.

After increasing the moisture content of the porous optical preform in the humidifying chamber, the now humidified porous optical preform has improved mechanical characteristics. In the embodiments described herein, the humidified porous optical preform has at least a 25% increase in crush strength relative to the crush strength of a porous optical preform prior to humidification. In some embodiments, the increase in crush strength may be greater than or equal to 100%, preferably greater than or equal to 150%, and, more preferably, greater than or equal to 200% relative to the crush strength of a porous optical preform prior to humidification. In some embodiments, the increase in crush strength may be greater than or equal to 220% or even greater than or equal to 350% relative to the crush strength of a porous optical preform prior to humidification. For example, in some embodiments described herein, the humidified porous optical preform has a crush strength of greater than or equal to about 1.6 MPa, preferably greater than or equal to about 2 MPa, and, more preferably, greater than or equal to about 2.5 MPa. The phrase "crush strength," as used herein, refers to the maximum load at failure of the soot compact portion of the porous optical preform when centered between MTS platens during a compression test with the top platten being driven at a down-drive rate of 0.01 cm/min.

In addition, the humidified porous optical preform has a compression modulus of greater than or equal to 121 MPa, preferably greater than or equal to 131 MPa, even more preferably greater than or equal to 145 MPa. The compression modulus can be calculated as the slope of the stress-strain curve obtained during the crush strength test described above.

It should be understood that the phrases "crush strength" and "compression modulus" refer to the properties of the soot compact portion of the porous optical fiber preform and not the core cane portion of the porous optical fiber preform, when included.

Figure 14:
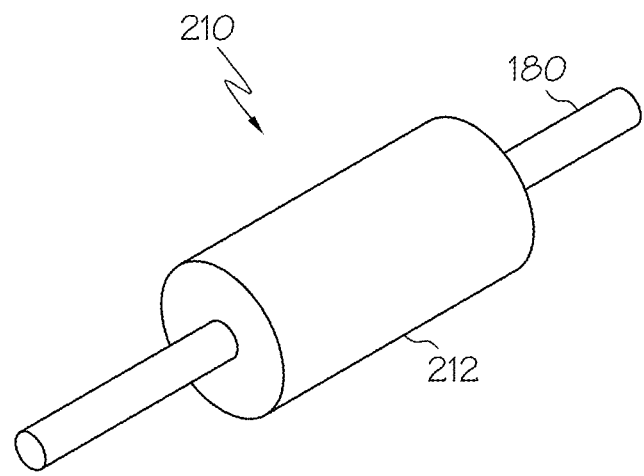
FIG. 14 depicts an optical preform produced according to one or more embodiments shown and described herein.

Referring now to FIG. 13, the soot compaction process described herein yields a humidified porous optical preform 200 which comprises a soot compact portion 198. The humidified porous optical preform 200 may be consolidated to sinter the soot compact portion 198 into dense silica glass, as shown in FIG. 14. In embodiments where the humidified porous optical preform 200 further comprises a glass core cane as shown in FIG. 14, the consolidation of the porous humidified soot compact portion 198 also joins the cladding portion 212 to the glass core cane 180 thereby forming a consolidated optical preform 210.

In one embodiment, the humidified porous optical preform 200 is consolidated to a consolidated optical preform 210 by affixing a handle to the glass core cane 180 and hanging the humidified porous optical preform 200 from a quartz immersion rod over a consolidation furnace. The consolidation furnace may generally comprise a tube furnace with a quartz muffle having a drying zone and a consolidation zone. The drying zone may be held at a temperature of about 1000° C. while the consolidation zone has a temperature gradient from about 1000° C. to about 1450° C. across the zone. The consolidation zone of the consolidation furnace may be maintained under a helium flow. The porous optical preform is held in the drying zone of the consolidation furnace and successively exposed to a flow of helium and oxygen and a flow of helium and chlorine in two isothermal hold periods in order to dry the humidified porous optical preform and remove carbon, water and transition metal impurities. After the drying treatment, the atmosphere in the tube furnace is then switched to a helium flow and the now dried porous optical preform is lowered through the consolidation zone to increase the temperature of the silica-based glass soot creating a vitreous flow of glass sufficient to form fully consolidated glass. Following consolidation, the now consolidated optical preform is withdrawn from the consolidation furnace and loaded into a 1000° C. holding oven for at least six hours to de-gas and anneal the sample.

EXAMPLES

The embodiments described herein will be further clarified by the following examples.

Example 1

Figure 15:
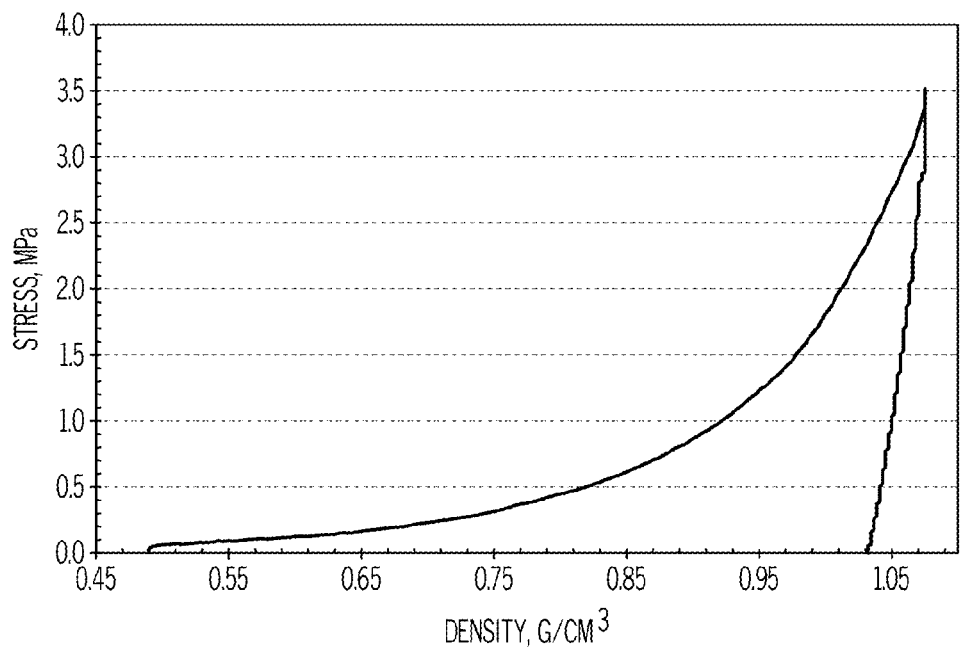
FIG. 15 graphically depicts the compaction stress (y-axis) as a function of the density (x-axis) of the compressed soot.
Figure 16:
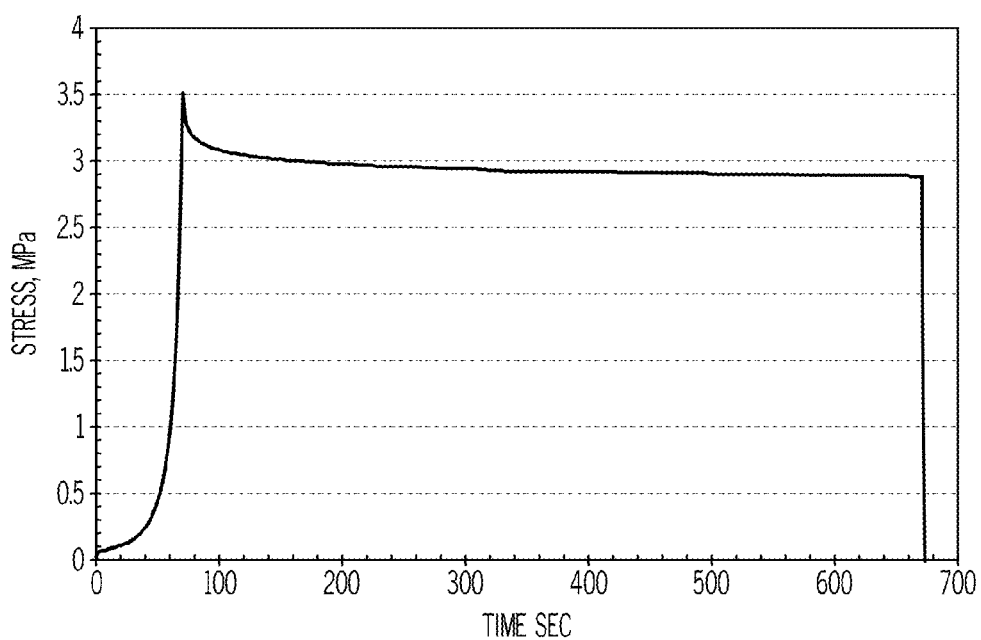
FIG. 16 graphically depicts the compaction stress (y-axis) as a function of time (x-axis) during compaction of silica-based glass soot.

In these examples, silica-based glass soot was utilized with a surface area of 25 $m^2/g$. This surface area corresponds to an average particle size of about 110 nm. Pellets were prepared for evaluation by an axially compressing the soot in a stainless steel mold set. The stainless steel mold set comprised a cylindrical mold with a bore having a polished inner diameter of 25.4 mm, and outer diameter of 44.5 mm and length of 80 mm. A first stainless steel ram having a diameter of 25.3 mm and a length of 19 mm length was fitted in the bore. Optionally, a 25.4 mm diameter sheet of waxed paper was positioned on the bottom surface of the first stainless steel ram to promote release of the test pellet. Six grams of the soot was poured into the mold and a second sheet of wax paper was positioned over the soot. Finally a second stainless steel ram with a 25.3 mm diameter was positioned on the top of the soot in the solid steel mold. The ram assembly was positioned between the flat compression platens of an MTS insight electromechanical test system. The test system was equipped with a 2 kN Load cell and MTS Insight data collection software. The soot was compacted to a load of 400 pounds force (1 bf) (181.4 kilogram force (kgf)) at a down drive rate of 0.2 mm/sec. The peak load was held for 10 minutes and then the pressure was released. The applied stress as a function of time was recorded during compaction. The compressed soot pellet was then extracted from the mold, weighed, and measured to determine the density of the pellet following compaction. Multiple pellet samples were fabricated using this technique, all having the same dimensions and density. FIG. 15 graphically depicts the stress (y-axis) as a function of density (x-axis) for the soot pellets during compaction. FIG. 16 graphically depicts the stress (y-axis) as a function of time (x-axis) during compaction and the subsequent relaxation of the imparted stress.

The pellet samples formed as described above were further processed to produce "dry-treated" pellets and "wet-treated" pellets. The dry-treated pellets were produced by placing the pellet samples into a furnace that was first purged with nitrogen gas for 7 days. The dry-treated pellets were processed in nitrogen for 180 minutes at temperatures of 200° C., 400° C., 600° C., and 800° C. to produce four dry-treated pellet conditions. The dry pellet samples processed at 200° C. and 400° C. were extremely weak after treatment, and were easily broken during careful removal from the furnace. No dry pellet samples treated at 200° C. could be tested for residual strength after treatment. A repetition of the 400° C. sample yielded a testable specimen. The wet-treated pellets were produced by placing the pellet samples into a furnace that was first purged with nitrogen gas for 18 hours. The wet-treated pellets were processed in a water-containing atmosphere of 100% steam at 1 atmosphere of pressure (~100° C. dew point) for 180 minutes at temperatures of 200° C., 400° C., 600° C., and 800° C. to produce four wet-treated pellet conditions. For both the dry treated and wet-treated experiments the post process weight was generally lower than the starting pellet weight by about ~0.5%.

The crush strength and compression modulus of the dry-treated pellets and wet-treated pellets were individually tested. All samples tested were removed from the furnace and equilibrated at about 22° C. and about 50% RH for 24-48 hours prior to testing. A flat surface of the cylindrical pellet was placed on the flat platen of compressive test fixture on the MTS Insight Electromechanical test system. A second flat platen was positioned in light contact with the top surface of the pellet. A compression test was then run by measuring the load as the top platen as the platen was moved to apply a compressive force on the pellet. The displacement rate was 0.01 cm/min and was continued until the load reached a maximum, thus indicating compressive failure of the part. Stress data was collected as a function of time. The stress curve was observed in real time for failure (past peak load) and the test was manually aborted at failure.

Figure 17:
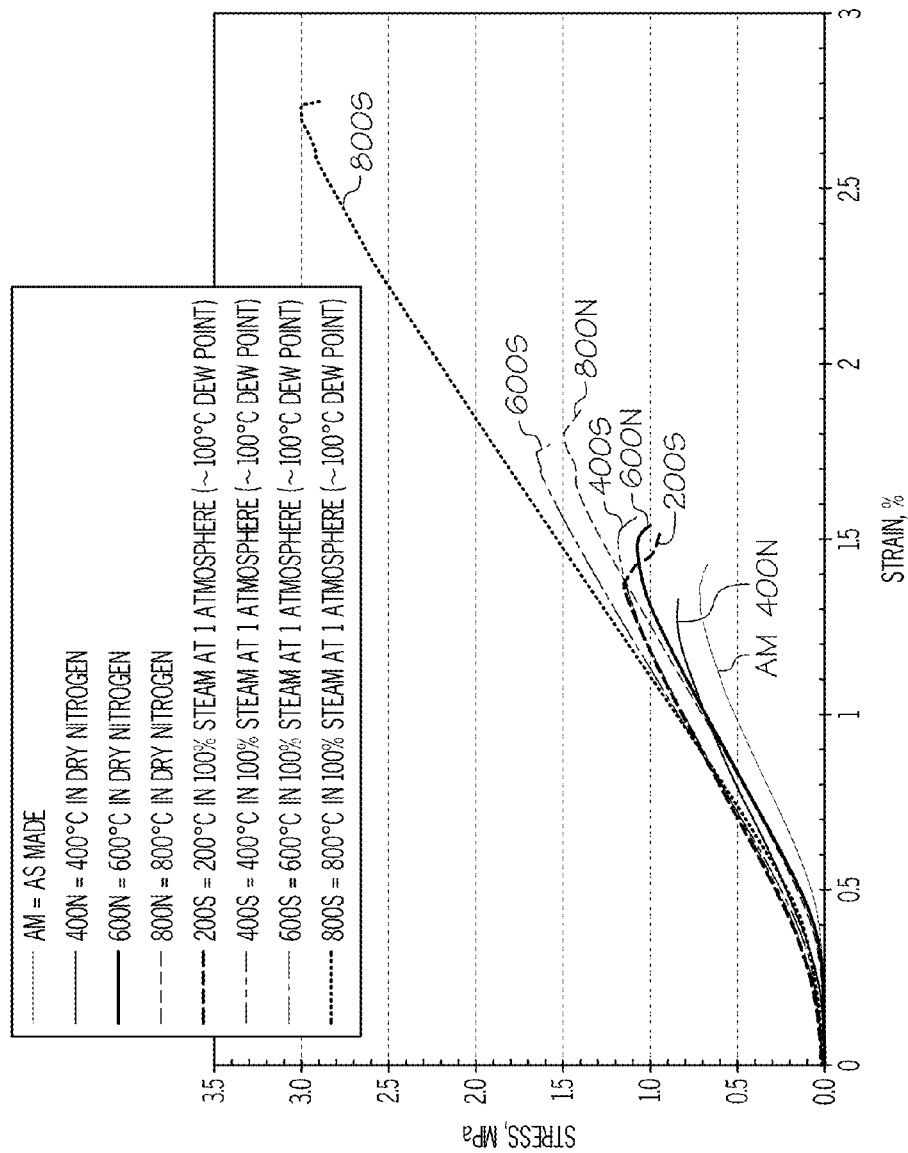
FIG. 17 graphically depicts the applied stress (y-axis) as a function of strain (x-axis) for wet and dry pellets during a compression test.

FIG. 17 graphically depicts the applied stress (x-axis) as a function of applied strain (y-axis) applied to each of the pellets during the compression test. As shown in FIG. 17, the wet-treated pellets generally had greater crush strength than the dry pellets produced at the same temperature. Moreover, the wet-treated pellets produced at 800° C. had significantly higher crush strength than any other treated pellets, wet or dry.

Figure 18:
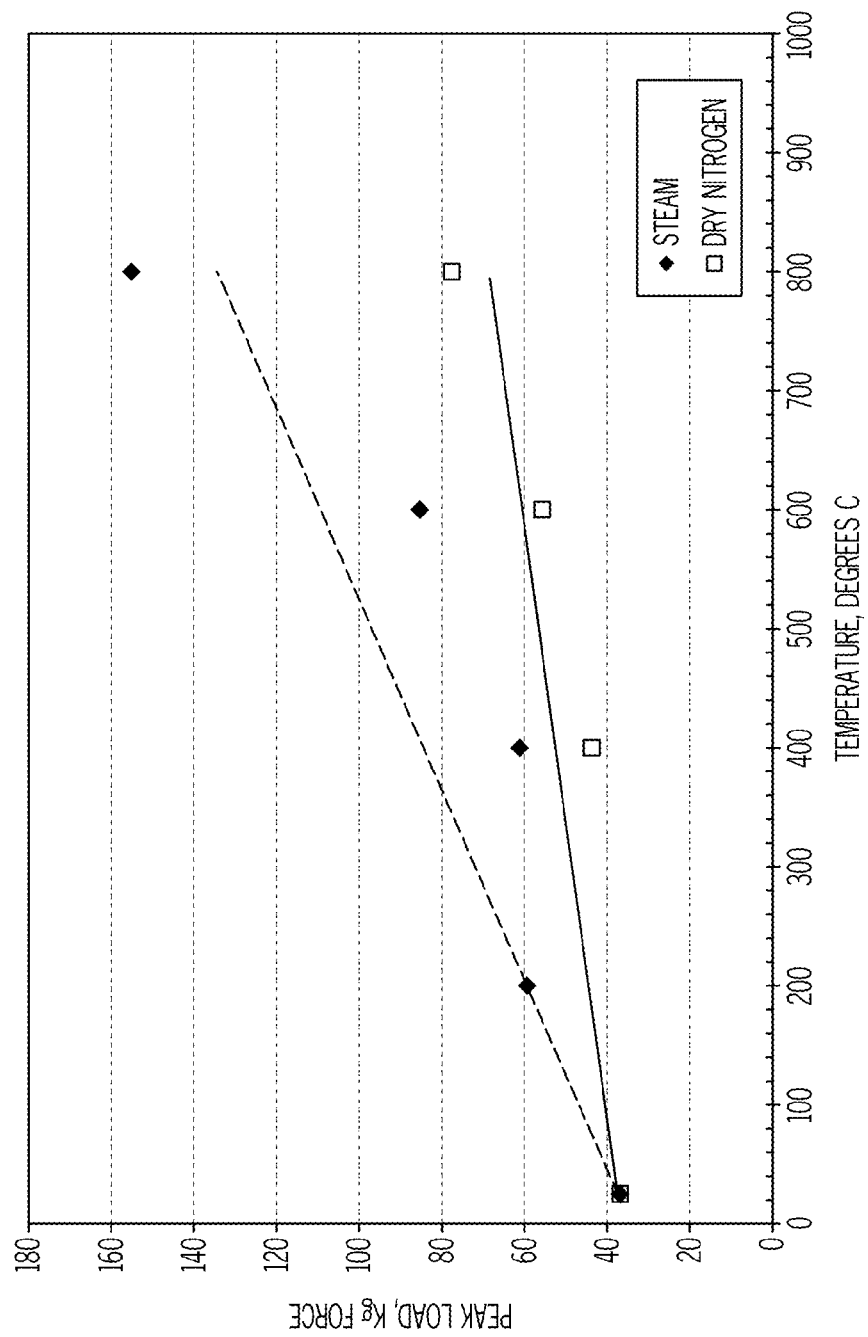
FIG. 18 graphically depicts the failure load (y-axis) as a function of processing temperature for wet and dry pellets during a compression test.
Figure 19:
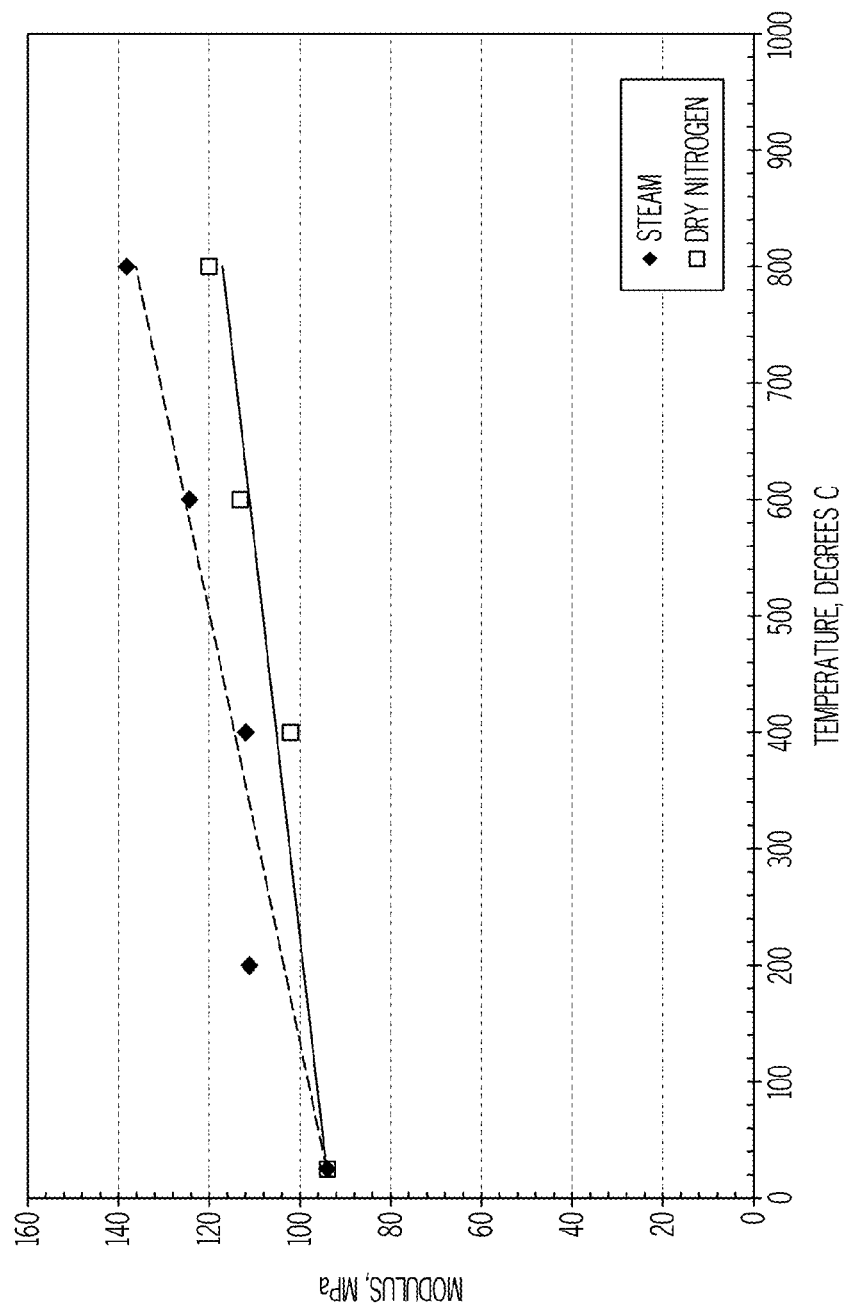
FIG. 19 graphically depicts the compression modulus (y-axis) as a function of processing temperature for wet and dry pellets during a compression test.

FIG. 18 graphically depicts the failure load (y-axis) as a function of processing temperature for both the dry and wet pellets. As shown in FIG. 18, the dry pellets show a substantially linear increase in strength with increasing processing temperature while the wet pellets show higher strength with an increasing slope (i.e., a non-linear increase in strength) with increasing processing temperature. FIG. 19 graphically depicts the compression modulus (y-axis) as a function of temperature for the dry and wet pellets. Both wet and dry pellets generally had a linear increase in the compression modulus with increasing processing temperatures with the wet samples showing approximately 5% higher modulus values than the dry samples.

These examples demonstrate the impact of both humidification and elevated temperature processing on the mechanical strength of compacted soot. It was found that pellets pressed from dry silica-based glass soot (i.e., soot which had a moisture content of less than 5 wt. %) had crush strength of approximately 80 psi (550 kPa) after pressing to a density of approximately 0.9 g/cc. These pellets were subjected to heating in a nitrogen environment. During heating, the moisture content of the pellet decreased which, in turn, decreased the strength of the soot pellet. However, as the temperature of the nitrogen environment was increased, the strength of the pellet also increased with the onset of necking between the particles. Despite the onset of necking, pellet failure (crumbling, etc.) still occurred at temperatures as high as 200° C. or even 400° C. However, pellets processed under humidified conditions over the same range of temperatures exhibited improvements in strength over those pellets subjected only to elevated temperatures. While not wishing to be bound by theory, it is believed that by supplying moisture to equilibrate the moisture absorbed on the particles avoids the weakening due to loss of moisture during heating. In addition, it is believed that providing an aqueous layer on the soot particles accelerates thermal strengthening by enhancing the necking rate, thereby providing greater strength at a given process temperature. As such, it is believed that increasing the moisture content of the soot compact portion of the porous optical preform increases the strength of the soot compact portion at low temperatures and that both the increased moisture content and the onset of necking between particles contribute to an increase in strength at higher temperatures.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for producing an optical preform, the method comprising:
    compressing silica-based glass soot to form a porous optical preform comprising a soot compact portion;
    heating the porous optical preform to a dwell temperature greater than or equal to 100° C.;
    humidifying the porous optical preform at the dwell temperature in a water-containing atmosphere having a dew point greater than or equal to 30° C. to form a humidified porous optical preform, wherein the soot compact portion of the humidified porous optical preform comprises greater than or equal to 0.5 wt. % water; and
    drying and consolidating the humidified porous optical preform.

2. The method of claim 1, further comprising heating the water-containing atmosphere to an initial temperature of at least 10° C. greater than the dew point of the water containing atmosphere prior to inserting the porous optical preform into the water-containing atmosphere.

3. The method of claim 1, wherein the soot compact portion of the humidified porous optical preform comprises less than or equal to about 12 wt. % water.

4. The method of claim 1, wherein the dew point of the water-containing atmosphere is greater than or equal to about 50° C.

5. The method of claim 1, wherein the porous optical preform is humidified for a dwell time from greater than or equal to 0.25 hour and less than or equal to 10 hours.

6. The method of claim 1, wherein the dwell temperature is greater than or equal to about 200° C.

7. The method of claim 1, wherein the silica-based glass soot consists essentially of silica glass particles having an average particle diameter greater than or equal to 5 nm and less than or equal to 5 microns and a surface area greater than or equal 5 $m^2/g$ and less than or equal to 250 $m^2/g$.

8. The method of claim 1, wherein the soot compact portion of the humidified porous optical preform has a crush strength which is at least 25% greater than a crush strength of the porous optical preform.

9. The method of claim 1, wherein the soot compact portion of the humidified porous optical preform has a crush strength greater than or equal to 1.6 MPa.

10. A method for producing an optical preform, the method comprising:
    compressing silica-based glass soot to form a porous optical preform comprising a soot compact portion, wherein the silica-based glass soot has an average particle size less than or equal to 10 µm and a surface area greater than or equal to about 10 $m^2/g$ and less than or equal to about 100 $m^2/g$;
    positioning the porous optical preform in a water-containing atmosphere having a dew point greater than or equal to 30° C. and an initial temperature at least 10° C. greater than the dew point;
    heating the porous optical preform from the initial temperature to a dwell temperature;
    holding the porous optical preform in the water-containing atmosphere for a dwell time sufficient to form a humidified porous optical preform, wherein the soot compact portion of the humidified porous optical preform has a crush strength which is at least 100% greater than a crush strength of the soot compact portion of the porous optical preform; and
    drying and consolidating the humidified porous optical preform.

11. The method of claim 10, wherein the soot compact portion of the humidified porous optical preform comprises greater than or equal to 0.5 wt. % water and less than or equal to 12 wt. % water.

12. The method of claim 10, wherein the silica-based glass soot comprises silica glass particles having an average particle diameter greater than or equal to 50 nm and less than or equal to 300 microns.

13. The method of claim 10, wherein the dwell temperature of the water-containing atmosphere is greater than or equal to about 200° C.

14. The method of claim 10, wherein the silica-based glass soot is compressed around a glass core cane.

* * * * *